(12) United States Patent
Moehlmann et al.

(10) Patent No.: US 7,635,058 B2
(45) Date of Patent: *Dec. 22, 2009

(54) HYDRAULIC CONTROL APPARATUS FOR AN AUTOMATIC DUAL-CLUTCH TRANSMISSION

(75) Inventors: Reinhard Moehlmann, Köln (DE); Martin Leibbrandt, Bedburg (DE)

(73) Assignee: Getrag Ford Transmissions GmbH, Scarletallee (DE)

( * ) Notice: Subject to any disclaimer, the term of this patent is extended or adjusted under 35 U.S.C. 154(b) by 448 days.

This patent is subject to a terminal disclaimer.

(21) Appl. No.: 11/534,173

(22) Filed: Sep. 21, 2006

(65) Prior Publication Data

US 2007/0062773 A1      Mar. 22, 2007

(30) Foreign Application Priority Data

Sep. 22, 2005    (EP) .................................. 05108778

(51) Int. Cl.
*F16D 25/00*    (2006.01)

(52) U.S. Cl. ................................................. 192/87.18
(58) Field of Classification Search ................ 192/3.58, 192/3.63, 87.13, 87.18, 87.19
See application file for complete search history.

(56) References Cited

FOREIGN PATENT DOCUMENTS

DE        101 34 115         1/2003

*Primary Examiner*—Dirk Wright
(74) *Attorney, Agent, or Firm*—Schlee IP International, P.C.; Alexander R. Schlee

(57) ABSTRACT

The invention relates to a hydraulic control device for an automatic dual-clutch transmission which has a first clutch and a second clutch, having a control valve unit which predefines at least one hydraulic parameter such as pressure and/or one volume flow. Regulating this parameter engages or disengage the clutches. An additional separating valve can is provided assuming a normal position when the second control signal is applied, so that at least one of the clutches can be operated by means of the control valve unit. The purpose is to provide enhanced operational safety against misoperation while at the same time secure availability of the clutches.

16 Claims, 1 Drawing Sheet

HYDRAULIC CONTROL APPARATUS FOR AN AUTOMATIC DUAL-CLUTCH TRANSMISSION

This application claims the priority of the European Patent Application EP05108778 having a filing date of Sep. 22, 2005, the entire content of which is herewith incorporated by reference.

BACKGROUND OF THE INVENTION

The invention relates to a hydraulic control device for an automatic dual-clutch transmission which has a first clutch and a second clutch.

Dual-clutch transmissions have been known for a relatively long time and are preferably used in motor vehicles. A dual-clutch transmission generally has a first partial transmission and a second partial transmission which are each assigned a group of gears. Here, the first clutch separates the first partial transmission from an engine of the motor vehicle, while the second clutch serves to separate the second partial transmission from, or connect the latter to, the engine.

As a result of the considerable mechanical expenditure in actuating two clutches and shifting the gears of both partial transmissions, dual-clutch transmissions are usually automatic, that is to say both the actuation of the clutches and the shifting of the gears is performed by means of associated auxiliary drives which are actuated by means of preferably one hydraulic control device.

There is often no provision in automatic dual-clutch transmissions for the driver of the motor vehicle to directly mechanically influence the transmission of torque of the dual-clutch transmission. In some dual-clutch transmissions, only a parking lock can be mechanically operated by the driver of the motor vehicle.

For safety reasons, the hydraulic control device should preferably be designed such that the torque flow through the dual-clutch transmission can always be reliably interrupted in the event of a fault. This can be provided by opening the clutches. For this purpose, the clutches are placed in an unpressurized state, as long as said clutches are hydraulically operated clutches which are open in the unpressurized state (normally open clutch).

A result of the above requirement is that a torque flow should also be interrupted when two individual faults which can have a direct effect on one another occur in succession.

In addition to the above described requirement regarding the safety of the dual-clutch transmission, it is also necessary to meet the requirement for the best possible availability of the motor vehicle in which the dual-clutch transmission is installed. The requirement of good availability is generally met when, in the event of an individual fault, at least one forward gear and one reverse gear are available in order to enable the vehicle to be moved in two directions.

The requirements regarding safety and availability are often not met by known control devices for dual-clutch transmissions. It is known for example from DE 101 34 115 A1 to actuate the first clutch (this correspondingly also applies to the second clutch) by means of a hydraulic path which consists of a first switching valve and a first control valve which is connected in series with the switching valve. The first switching valve, which can be operated by means of an electrical control signal, places the first clutch in an unpressurized state in a rest position, and when said first switching valve is in a position which it assumes when it has a current applied to it, it connects the main pressure line to the first control valve which is controlled by means of an electrical control signal.

If, for example, the first switching valve can no longer be switched out of its rest position, the first clutch can no longer be operated. If reverse driving is effected via said clutch, the motor vehicle is no longer available, according to the above requirement, in the event of one single fault (failure of the first switching valve).

On the other hand, the first clutch, as long as it requires an actuating pressure to be closed, can no longer be opened if both the switching valve can no longer be placed in the rest position and also the pressure or the volume can no longer be reduced sufficiently by the control valve. In this case, the first clutch remains closed and the torque flow in the dual-clutch transmission can no longer be separated.

The same also applies to the second clutch. The dual-clutch transmission has, for the second clutch, a second switching valve and a second control valve, the same relationships arising in a similar way to the first clutch.

SUMMARY OF THE INVENTION

The invention is therefore based on the object of providing a hydraulic control device for an automatic dual-clutch transmission which is of simple and cost-effective design and is as operationally safe and as available as possible.

The object on which the invention is based is achieved by means of the control device according to Claim 1. Preferred embodiments can be gathered from the subclaims.

The control device of the invention according to Claim 1 is distinguished in that, in an isolating position, an separating valve, which can be operated by means of a first control signal and by means of a second control signal, places the clutches in an unpressurized state and/or separates said clutches from the control valve unit, the separating valve assuming a normal position when the second control signal is applied, so that at least one of the clutches can be operated by the control valve unit.

The separating valve therefore makes it possible to place the clutches in an unpressurized state regardless of the positions which the first switching valve and the second switching valve are in, and therefore, as long as the clutches can only transmit torque when pressurized, to reliably interrupt the torque flow through the dual-clutch transmission.

The second control signal ensures that the separating valve can be switched from the isolating position into the normal position even if the first control signal is unintentionally applied as a result of a fault. The separating valve is designed such that it assumes the normal position when the first and second control signals are applied simultaneously.

The term "control signals" is also to encompass hydraulic control pressures or control volumes, as long as hydraulically actuated valves are involved. This is preferably the case with the switching valves and also the separating valve.

In a preferred exemplary embodiment, the separating valve, in the isolating position, separates the control valve unit from a main pressure line. In this case, the separating valve is situated between a main pressure supply and the control valve unit. Said separating valve can be designed such that, in the isolating position, it connects the lines between the control valve unit and the first and second clutches to an oil sump or a tank, and therefore places said lines in an unpressurized state.

The second switching valve is preferably assigned a signal element which provides the control signal for the second switching valve and the second control signal for the separating valve, said separating valve assuming the normal position when said second control signal is applied. The signal element assigned to the second switching valve serves, during normal operation, to generate the control signal which can operate the second switching valve. At the same time, the signal element delivers the control signal by means of which the separating valve can be placed back in the normal position, regardless of whether the first control signal is applied to the separating valve or not.

In a preferred exemplary embodiment, when the second control signal is applied to the separating valve, the second switching valve assumes a position $B_{II}$, in which the second clutch is placed in an unpressurized state and/or is separated from the control valve unit. The second switching valve and the separating valve therefore operate in a push-pull fashion: when the first control signal is applied to the separating valve, the second clutch is placed in an unpressurized state by the separating valve. If, in contrast, the second control signal is applied to the separating valve, the latter is placed or held in the normal position regardless of the first control signal being applied, so that the separating valve then no longer places both clutches in an unpressurized state. However, the second switching valve is then inevitably situated in the position $B_{II}$ in which the second clutch is likewise placed in an unpressurized state.

In one preferred exemplary embodiment, the separating valve can be operated by means of a control signal of an actuator which actuates a further valve unit of the hydraulic control device. This makes it possible to dispense with a signal element which is generally electrically operated and involves relatively high costs. A control signal which is already present in the hydraulic control device is therefore used for operating/actuating the separating valve. This should be a control signal which does not bring about any undesired side-effects when operating the separating valve.

The actuator is preferably designed as a dual-region regulator, the further valve unit being actuated, and it being possible to regulate said further valve unit within corresponding limits, in a first region. The separating valve can be operated in a second region. As long as the dual-region regulator is in the first region, the separating valve does not switch. Only when the second region is reached can the separating valve be operated by means of the actuator.

In the second region, the further valve unit preferably assumes an emergency position. Said emergency position is to be designed such that the valve unit can still perform its intended function at least to a sufficient extent.

The further valve unit can be embodied as a cooling oil regulator. Said cooling oil regulator can be a proportional regulator which, in the first region of the two-region regulator, regulates the cooling oil quantity and, in the second region, supplies the clutches with a minimum required quantity of cooling oil.

In one preferred embodiment, the control valve unit provides at least one pressure and/or volume flow, which can be regulated, for actuating a gearshift system for engaging/disengaging gears in the dual-clutch transmission. The control valve unit therefore assumes not only the function of actuating the first and second clutches but also that of automatically engaging and disengaging the gears in the dual-clutch transmission.

The first switching valve can, in the position $A_I$, connect the first control valve to the first clutch and separate said first control valve from the gearshift system and can, in the position $B_I$, connect the first control valve to the gearshift system and separate said first control valve from the first clutch, while the second switching valve can, in a position $A_{II}$, connect the second control valve to the second clutch and separate said second control valve from the gearshift system and, in a position $B_{II}$, connect the second control valve to the gearshift system and separate said second control valve from the second clutch.

By means of said arrangement of the control valves and of the switching valves, the gearshift system for shifting the gears can be connected to both control valves by means of corresponding positions $B_I$, $B_{II}$. This makes it possible for both the first control valve and the second control valve to supply a regulated pressure or regulated volume flow for the gearshift system. Said exemplary embodiment therefore permits shifting of the gears regardless of which of the two control valves fails.

In addition, the exemplary embodiment has the advantage that the two clutches can be operated and the gears can be shifted by means of only two control valves. This allows the production costs for such a control device to be kept low, since control valves such as a control valve or a flow regulator are more expensive than switching valves.

A changeover switch can be provided between the first switching valve and also the second switching valve and the gearshift system, said changeover switch ensuring that the gearshift system is acted on either only by the pressure or volume flow of the first control valve or only by the pressure or volume flow of the second control valve. Said changeover switch serves to break the connection between the gearshift system and the control valve which is not (currently) provided for controlling the shift system or cannot assume control as a result of a fault. The control of the gearshift system is therefore not adversely affected by an undesired superposition of two control valves, of which one could potentially be defective.

The changeover switch is preferably embodied as a shuttle valve. Here, the shuttle valve, for example in the form of a three-way ball valve, has a first inlet, a second inlet and an outlet, the first inlet being connected to the first control valve and the second inlet being connected to the second control valve. The outlet of the changeover switch is connected to the gearshift system. The shuttle valve produces a connection between the outlet and that inlet which has the higher pressure applied to it, while simultaneously breaking the connection between the outlet and that inlet which has the lower pressure applied to it.

In a preferred exemplary embodiment, in the position $B_I$ of the first switching valve and in the position $B_{II}$ of the second switching valve, the first control valve is connected to the second clutch and the second control valve is connected to the first clutch. This allows the first and second clutches to be operated even if one of the control valves has failed. If, for example, the first control valve has failed, the first clutch can be operated by means of the second control valve, as long as the first and second switching valves are in the respective positions $B_I$ and $B_{II}$. The second clutch can also likewise be operated by means of the second control valve if the second switching valve is switched into the position $A_{II}$. Regardless of this, the second control valve can also take over the control of the gearshift system if the second switching valve is in the position $B_{II}$. Although shifting is no longer possible without an interruption in tractive force when one control valve has failed, the dual-clutch transmission can still be shifted into any gear and can be operated in said gear.

BRIEF DESCRIPTION OF THE DRAWINGS

The invention is explained in more detail on the basis of an exemplary embodiment illustrated in FIG. 1. Here.

DETAILED DESCRIPTION OF THE DRAWINGS

Figure 1:
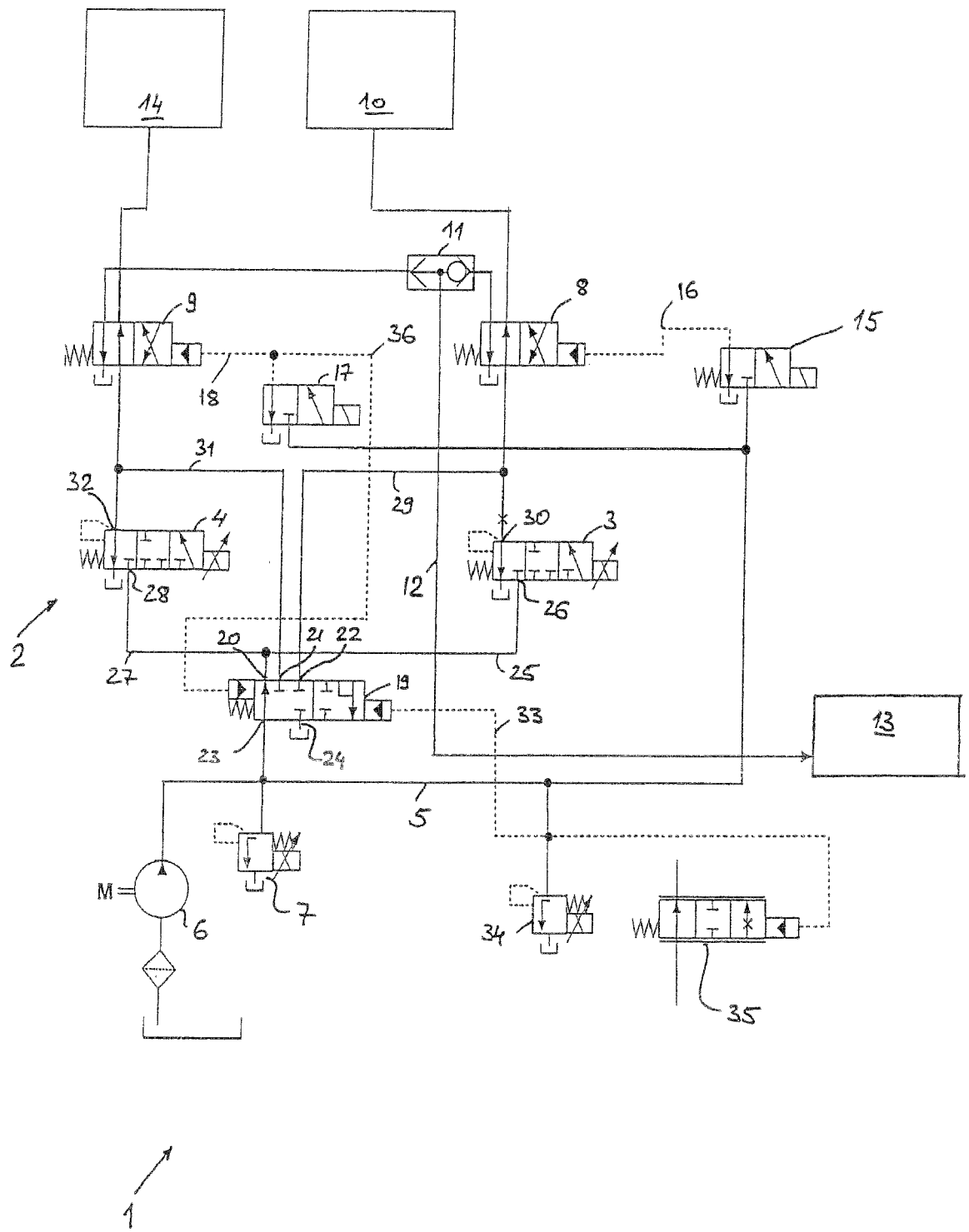
FIG. 1 shows a block circuit diagram of a preferred exemplary embodiment.

A control device, which is denoted in its entirety by 1, comprises a control valve unit 2 with a first pressure control valve or control valve 3 and a second control valve 4. The two control valves 3, 4 can be connected, at their inlets, to a main pressure accumulation line 5. A pump 6 in combination with a main control valve 7 ensures the corresponding main pressure.

The first control valve 3 is assigned a first switching valve 8, and the second control valve 4 is assigned a second switching valve 9. The first control valve 3 can be connected by means of the first switching valve 8 to either the first clutch 10 or a changeover switch 11, which is embodied as a pressure changeover switch and is connected via a line 12 to a gearshift system 13 which is not illustrated in any more detail here. A regulated pressure of the second control valve 4 can be applied, by means of the second switching valve 9, to either the pressure changeover switch 11 or a second clutch 14.

The control device 1 can control a dual-clutch transmission having two separate clutches (cf. first clutch 10 and second clutch 14) and having a plurality of actuating members of the gearshift system 13, by means of which individual gears of the dual clutch transmission can be engaged or disengaged. Here, the dual-clutch transmission comprises a first partial transmission and a second partial transmission which are assigned to the first and second clutches 10, 14 respectively. If a pressure is applied to a clutch cylinder of a clutch, the clutch is closed, said clutch otherwise being held open by means of a spring force. In the closed state, the clutch transmits a torque between a drive unit and the associated partial transmission.

A signal element 15 is provided for actuating the first switching valve 8. The signal element 15 is connected to the first switching valve 8 via a signal line 16. Here, the signal element 15 is operated by means of an electrical signal and, in the activated state, applies the main pressure to the switching valve 8 via the signal line 16. In the position of the signal element 15 illustrated in FIG. 1, the signal line 16 is deventilated or placed in an unpressurized state, so that the first switching valve 8 assumes the rest position illustrated in FIG. 1, or a position $A_I$. If the main pressure as a control pressure is applied to the first switching valve 8, the first clutch 10 is placed in an unpressurized state, and the first control valve 3 is simultaneously connected to the changeover switch 11, so that only a regulated pressure can then pass via the line 12 to the gearshift system 13.

A signal element 17 is provided for actuating the second switching valve 9, said signal element 17 conducting a control pressure to the second switching valve 9 via a signal line 18. Like the signal element 15, the signal element 17 is an electrically operated valve. In the activated state, said signal element 17 passes the main pressure 5 as a control pressure via the signal line 18 to the second switching valve 9, which then switches from the rest position illustrated in FIG. 1, or from a position $A_{II}$, into the activated position or position $B_{II}$. In the position $A_{II}$, the control valve 4 is connected to the clutch 14. In the position $B_{II}$, the second clutch 14 is placed in an unpressurized state, and the second control valve 4 is connected to the changeover switch 11.

The control device 1 additionally comprises an separating valve 19. The separating valve 19 is embodied as a hydraulically operated 5/2 directional switching valve having three outlets 20, 21, 22 and two inlets 23, 24. The outlet 20 of the separating valve 19 is connected via a line 25 to an inlet 26 of the first control valve 3. In addition, a line 27 connects the outlet 20 of the separating valve 19 to the inlet 28 of the second control valve 4. The inlet 23 of the separating valve 19 is connected to the main pressure accumulation line 5.

In a normal position illustrated in FIG. 1, the separating valve 19, by means of the inlet 23 and the outlet 20, connects the main pressure accumulation line 5 to the inlets 26, 28 of the control valves 3, 4. In the normal position of the separating valve 19, therefore, the main pressure is applied to the control valves 3, 4 at the inlet side.

The outlet 22 of the separating valve 19 is connected to an outlet 30 of the first control valve 3 via a line 29. Similarly, a line 31 connects the outlet 21 of the separating valve 19 to an outlet 32 of the second control valve 4. In a position other than the normal position, that is to say an isolating position, the connection between the inlet 23 and the outlet 20 of the separating valve is interrupted. In the isolating position, the separating valve therefore separates the main pressure accumulation line 5 from the inlets 26, 28 of the control valves 3, 4. In addition, in the isolating position, the inlets and outlets 21, 22, 24 of the separating valve 19 are connected to one another. Since the inlet 24 of the separating valve 19 is connected to a tank or an oil sump, in the isolating position, the lines 29, 31 and therefore also the outlets 30, 32 of the control valve 3, 4 are placed in an unpressurized state. This places the clutches 10, 14 in an unpressurized or deventilated state, so that the two clutches 10, 14 can no longer transmit torque.

The hydraulically operated separating valve 19 obtains a first control pressure via a signal line 33 from a cooling oil actuator 34. The cooling oil actuator 34 is embodied as a dual-region regulator. A cooling oil regulator 35 can be controlled in a first pressure region of the dual-region regulator 34, said cooling oil regulator 35 providing a regulated cooling oil quantity. In a second region of the dual-region regulator 34, the cooling oil regulator 35 switches into an emergency position in which a limited but sufficiently great cooling oil quantity is ensured by means of an aperture.

The separating valve 19 can be operated by a second control pressure in addition to the control pressure which is generated by the cooling oil actuator 34. Said second control pressure is provided by the signal element 17 which is connected via a signal line 36 to the separating valve 19. Here, the separating valve 19 is designed in such a way that, when the second control pressure is applied, the separating valve 19 assumes the normal position illustrated in FIG. 1 regardless of the first control pressure.

As can be gathered from FIG. 1, when the signal element 17 passes the main pressure through to the signal lines 18, 36, the main pressure is simultaneously applied to the second switching valve 9 and the separating valve 19. In this case, the second clutch 14 is placed in an unpressurized state by means of the second switching valve 9. If, however, only the first control pressure is applied to the separating valve 19, for example because the signal element 17 can no longer pass the main pressure through, the isolating element 19 is situated in the isolating position in which the second clutch 14 is likewise placed in an unpressurized state.

The separating valve 19 provides the control device 1 according to the invention with the additional capability of interrupting the torque flow in the dual-clutch transmission in the way described above. The operation of the separating valve 19 by means of the second control signal or by means of the second control pressure, which passes to the separating valve 19 from the signal element 17 via the line 36, allows the separating valve to switch into the normal position. This reliably avoids that, despite a fault relating to the first control pressure, the dual-clutch transmission can transmit torque by means of the first clutch 10. The first clutch 10 should therefore expediently be connected to that partial transmission which comprises at least one forward gear and one reverse gear of a vehicle in which the dual-clutch transmission is installed. The motor vehicle can therefore still be moved in both directions even in the event of a fault relating to the first control signal.

LIST OF REFERENCE SYMBOLS

1 Control device
2 Control valve unit
3 First control valve
4 Second control valve
5 Main pressure collecting line
6 Pump
7 Main control valve
8 First switching valve
9 Second switching valve
10 First clutch
11 Changeover switch
12 Line
13 Gearshift system
14 Second clutch
15 Signal element
16 Signal line
17 Signal element
18 Signal line
19 Separating valve
20 Outlet
21 Outlet
22 Outlet
23 Inlet
24 Inlet
25 Line
26 Inlet
27 Line
28 Inlet
29 Line
30 Outlet
31 Line
32 Outlet
33 Signal line
34 Cooling oil actuator
35 Cooling oil regulator
36 Line

The invention claimed is:

1. Hydraulic control device for an automatic dual-clutch transmission having a first clutch and a second clutch, said hydraulic control device comprising:
a control valve unit setting at least one hydraulic parameter from the group consisting of pressure and volume flow for actuating the first and second clutches, said control valve unit comprising:
a first control valve
a second control valve, and
a switching valve unit,
wherein by means of the control valve unit the clutches can be separated from the control valve unit;
the switching valve unit comprising:
a first switching valve, and
a second switching valve,
wherein the first and second switching valve can both be operated by means of a control signal;
a separating valve that can be operated by means of a first control signal and by means of a second control signal and can separate the clutches from the control valve unit, the separating valve assuming a normal position when the second control signal is applied, so that at least one of the clutches can be operated by the control valve unit.

2. Control device according to claim 1, wherein the hydraulic parameter is a pressure and the separation from the control valve takes place by switching the clutches into an unpressurized stage.

3. Control device according to claim 1, wherein the hydraulic parameter is a volume flow and the separation from the control valve takes place by cutting the volume flow off.

4. Control device according to claim 1, wherein the separating valve, in the isolating position, separates the control valve unit from a main pressure line.

5. Control device according to claim 1, wherein the second switching valve is assigned a signal element which provides the control signal for the second switching valve and the second control signal for the separating valve, said separating valve assuming the normal position when said second control signal is applied.

6. Control device according to claim 1, wherein, when the second control signal is applied to the separating valve, the second switching valve assumes a position $B_{II}$ in which the second clutch is placed in an unpressurized state.

7. Control device according to claim 1, wherein, when the second control signal is applied to the separating valve, the second switching valve assumes a position $B_{II}$ in which the second clutch is separated from the volume flow from the control valve unit.

8. Control device according to claim 1, wherein the first control signal for the separating valve is generated by an actuator which actuates a further valve unit.

9. Control device according to claim 8, wherein the actuator is designed as a dual-region regulator, the further valve unit being actuated in a first region, and it being possible for the separating valve to be operated, or placed in the isolating position, in a second region.

10. Control device according to claim 9, wherein, in the second region, the further valve unit assumes an emergency position.

11. Control device according to claim 8, wherein the further valve unit serves to regulate cooling oil.

12. Control device according to claim 1, wherein the control valve unit provides at least one hydraulic parameter from the group consisting of pressure and volume flow for actuating a gearshift system for engaging/disengaging gears in the dual-clutch transmission.

13. Control device according to claim 12, wherein the first switching valve, in the position $A_I$, connects the first control valve to the first clutch and separates said first control valve from the gearshift system and, in the position $B_I$, connects the first control valve to the gearshift system and separates said first control valve from the first clutch, and the second switching valve, in a position $A_{II}$, connects the second control valve to the second clutch and separates said second control valve from the gearshift system and, in a position $B_{II}$, connects the second control valve to the gearshift system and separates said second control valve from the second clutch.

14. Control device according to claim 13, wherein a changeover switch is provided between the first switching valve and also the second switching valve and the gearshift system, said changeover switch ensuring that the gearshift system is acted on either by the pressure or volume flow of the first control valve or by the pressure or volume flow of the second control valve.

15. Control device according to claim 14, wherein the changeover switch is preferably embodied as a 3-way ball valve.

16. Control device according to claim 1, wherein, in the position $B_I$ of the first switching valve, and in a position $B_{II}$ of the second switching valve, a connection is produced between the first control valve and the second clutch, and a connection is produced between the second control valve and the first clutch.

* * * * *